UNITED STATES PATENT OFFICE.

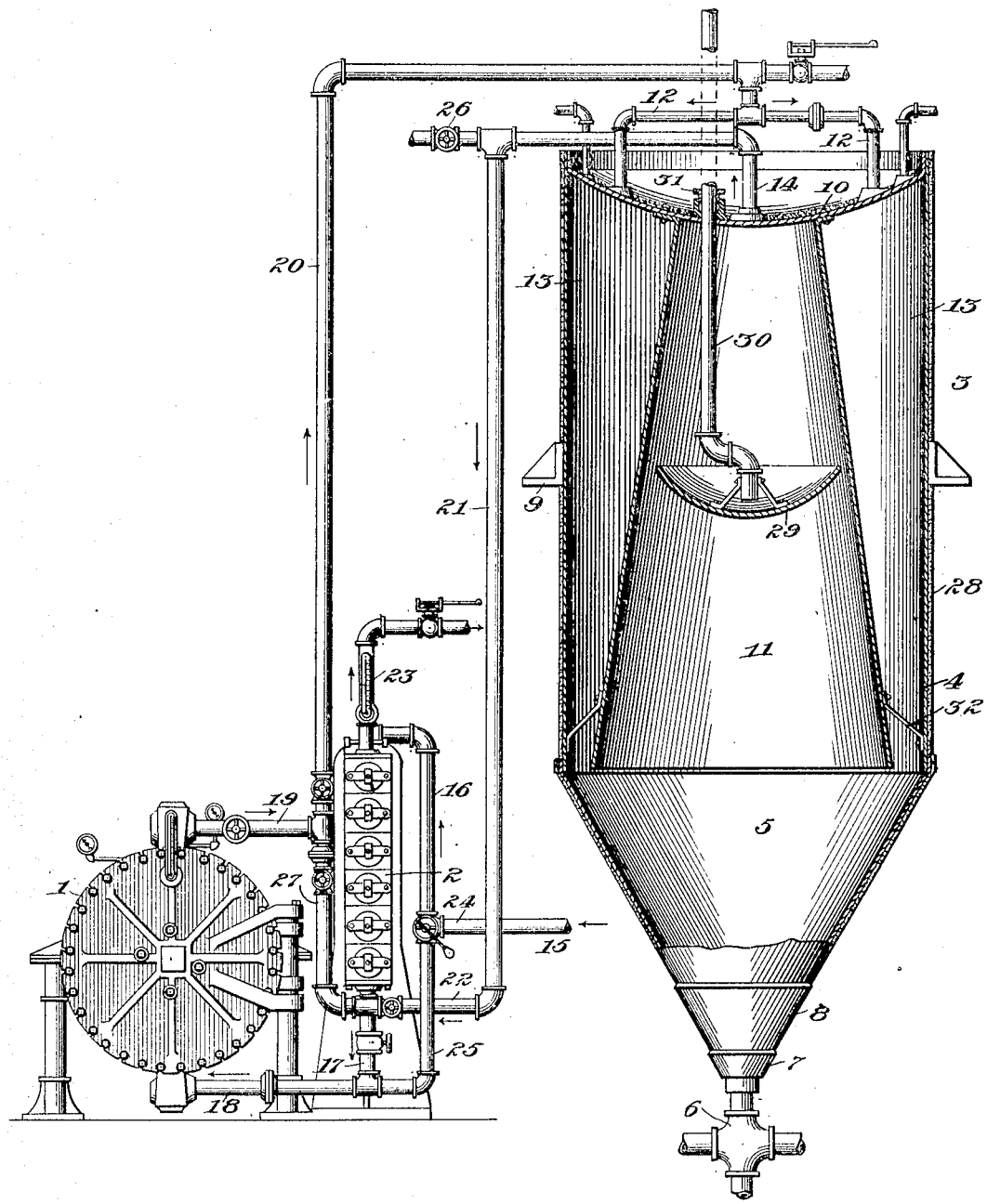

EUGENE W. DEMING, OF NEW YORK, N. Y.

PROCESS OF SEPARATING SOLIDS FROM LIQUIDS.

No. 885,451.　　　Specification of Letters Patent.　　Patented April 21, 1908.

Application filed May 20, 1907. Serial No. 374,673.

*To all whom it may concern:*

Be it known that I, EUGENE W. DEMING, a citizen of the United States, residing at New York, in the county of New York and State of New York, have invented certain new and useful Improvements in Processes of Separating Solids from Liquids, of which the following is a specification.

In my prior patent Number 531,460, issued December 25, 1894, I have described and claimed a process of and apparatus for defecating saccharine solutions, the apparatus comprising essentially a digester or heater, an absorber or cooler, and an open settling tank designed to operate under continuous flow, suitable conduits being provided whereby the liquid to be treated is led through the several devices is succession. As therein described the cold liquid first enters the absorber, passing thence through the digester in which it is highly heated, preferably to a temperature exceeding its atmospheric boiling point; the superheated liquid from the digester then reënters the absorber and is cooled therein to a temperature not exceeding its atmospheric boiling point, the cooling being effected by transfer of heat to the cold liquid passing through the absorber on its way to the digester. The partially cooled liquid is then led to the continuous settling tank where the suspended impurities are separated.

My present invention is a process of treating liquids carrying solids in suspension, and specifically saccharine solutions, the object of the invention being to separate the solids in a more economical and expeditious manner than has heretofore been possible, and in the case of saccharine and similar solutions to avoid the possibility of deterioration of the solutions by fermentation or otherwise.

The invention is based upon the observation that while the specific gravity of liquids and solutions is reduced at high temperatures, the specific gravity of suspended solids or coagulated impurities is substantially unaffected, from which it follows that such solids or impurities will separate with comparative rapidity and completeness from highly heated liquids. To secure this a closed receptacle or separator is used. A further advantage in maintaining the liquid under pressure during the separation lies in the fact which I have observed that under these conditions the separation of gas bubbles, which under ordinary circumstances tend to cling to the solid particles and to maintain them in suspension, is largely avoided.

For full understanding of my invention reference is made to the accompanying drawings showing a digester and absorber of conventional form in elevation, and a suitable separator or settling tank in vertical section.

Referring to the drawings, 1 represents a digester which may conveniently be of the type shown in my Patent Number 531,460 above referred to; 2 is an absorber of the general type therein described, its essential feature being the provision of two independent passages for liquid whereby a transfer of heat may be effected between two bodies or between two portions of the same body of liquid. The construction of these devices is well understood by those skilled in the art and they need not be further described herein.

3 represents a closed separating tank comprising in the particular form shown a cylindrical sheet-metal body 4 to which is secured a conical bottom 5 having an outlet 6 for the precipitate; the bottom is suitably reinforced as shown at 7, 8, and appropriate supporting lugs or brackets 9 are provided. The tank is provided with a liquid-tight cover 10, of sheet-metal, which may be inwardly or outwardly arched to withstand high internal pressures of liquid. 11 is an interior pipe or partial partition which is secured to the cover 10 and may be entirely supported thereby, or may be partially supported from the body of the tank as by brackets 32. The purpose of this pipe or partition, hereinafter designated the "uptake" is to provide a tortuous passage for the liquid within the tank and to avoid convection currents, the entering liquid carrying solid matter in suspension being introduced through pipes 12, 12 and flowing downwardly through the annular passage 13 between the uptake 11 and the cylindrical body 3 of the tank; the liquid flows around the base of the uptake 11, upwardly through the same, and escapes from the tank at 14, passing thence to the absorber as hereinafter described. The uptake is preferably of substantially conical form, the base being wider than the top as herein shown and as described in my prior patent Number 566,726, patented August 25, 1896, in order that the upward rate of movement of liquid in the lower portion of the tank may be relatively slow and the solids effectively separated.

When operating to separate the solid matters or impurities under high pressure and temperature, the course of the liquid through the apparatus is as indicated by the arrows upon the figure and is as follows: The liquid enters the system at 15 and passes by pipe 18 to the upper portion of the absorber 2, which it traverses, flowing thence by pipes 17 and 18 to the digester 1, wherein it is heated, preferably but not necessarily to a temperature exceeding its atmospheric boiling point. The heated liquid then passes directly by pipes 19, 20 to the inlets 12, 12 of the settling tank 3, the temperature and pressure of the liquid being substantially maintained during its passage through the tank and during the separation or precipitation of the solids or impurities. To assist in maintaining the temperature the tank may be covered with a heat-insulating coating 28. The hot liquid passes from the tank at 14 and is led by pipes 21, 22 to the lower portion of the absorber 2, rising through the absorber and transferring a portion of its heat to the cold liquid entering at 15, as heretofore described. The now partially cooled and clear liquid escapes from the absorber at 23 and is led to the evaporating system or otherwise disposed of as may be desired.

Suitable controlling and safety valves are provided in the piping system as will be understood without particular description. I prefer to so arrange the piping system that either the absorber or the separating tank may be temporarily or permanently disconnected for convenience in repairing or for other reasons which may render it desirable. Thus by means of the inlet valve 24 the inflowing liquid may be directed by pipe 25 to the digester 1 without passing through the absorber, and similarly the clear liquid flowing from the tank 3 may be conducted by pipe 26 directly to the evaporator without further cooling, the absorber being then entirely disconnected from the system. Or the evaporating tank may be disconnected by closing the valve in pipe 20 and opening the valve in pipe 27, in which case the heated liquid from the digester passes directly through the absorber. The precise manner in which the apparatus is used will depend to some extent upon the degree to which the liquid is heated in the digester 1; if the liquid is not highly heated therein the importance of the subsequent abstraction of heat in the absorber will be correspondingly lessened.

The discharge 6 for the solid matter may be provided with three branches as shown, which are connected respectively with the filter presses or bags, the scum tanks, and the suction of the filter press pump, thus permitting a considerable range for the disposal of the precipitate. The filter press being connected directly with the tank may be operated exclusively by the pressure therein, thus avoiding the use of pumps or scum tanks, the necessity of adding water to the scums, the addition of lime to the scums, the necessity of heating the same and the labor incident to the operation of scum tanks.

For the removal of any scum which may accumulate in the region of the discharge of the tank 4 I prefer to provide a device comprising a concave casting or basin 29 arranged within the uptake 11 and carried by a pipe 30 which is vertically adjustable in a stuffing-box 31, and delivers to the juice or gravity filters or to bag filters. By permitting the juice to discharge through pipe 30, the scum overflows the sides of the basin 29 and passes thence from the tank. The basin may be gradually lowered until the juice discharged is free from scum, when the delivery through the regular channels may be resumed.

In cases where it is practicable to filter the entire body of juice I may convey the juice from the heater through a closed tank, column or the like of sufficient size to afford the time and conditions requisite for flocculation, and thence directly to the filter presses. The temperature in this case need not necessarily exceed the boiling point under atmospheric pressure, but should be sufficiently high to secure effective defecation and to insure ready filtration. If desired the juices may be cooled either before or after filtration by transferring heat therefrom to the inflowing juice.

When treating saccharine or other solutions in which a flocculation due to the temperature occurs, it is found that in practice the impurities do not separate in flocculent form before the liquid reaches the tank 4. This is highly advantageous for the reason that such solutions show no tendency to clog or scale the pipes which they traverse on their way to the tank. It is to be understood that little or no settling of the solids in the usual meaning of this term occurs in the separating tank; the solids are in fact conveyed to a point near the bottom of the tank by the inflowing liquid, where, owing to their higher specific gravity, they remain until withdrawn. The construction of the tank and the relative position of its inlet and discharge openings, which are so situated that the hottest liquid is always in proximity to the outer walls of the tank, are such as to avoid the production of convection currents or any disturbances of the separated matter. Obviously the apparatus may be operated intermittently in order to afford any desired period for the separation of the impurities in the tank 4.

As applied to the treatment of saccharine solutions, as juices from sugar cane, the juice is first treated with lime, or with lime and sulfur dioxid, and is then conveyed through the pipes of the digester or heater at such rate as to prevent substantial separation or flocculation of the precipitate; thereafter the juice is brought to rest or to a condition of relatively slow movement, as in the course of its passage through the tank 4, for such period as may be required for the flocculation of the precipitate, being preferably maintained under pressure during this period. The precipitate is then separated by the most available means, which may involve both subsidence and filtration, and the clear juice is preferably cooled by transferring a portion of its heat to the inflowing juice, to the approximate temperature of the evaporators, in order that these may operate regularly and without objectionable variations of temperature. The clarified juice is then led directly to the evaporators.

I claim:

1. The process of separating solids from liquids which consists in heating a liquid carrying solids in suspension while preventing flocculation of the solids, then permitting said solids to flocculate and collecting them beneath a body of the heated liquid, and finally cooling said liquid by transferring heat therefrom to the inflowing liquid.

2. The process of separating solids from liquids which consists in heating a liquid carrying solids in suspension while preventing flocculation of the solids, then permitting said solids to flocculate while retaining them under pressure and collecting them beneath a body of the heated liquid, and finally cooling said liquid by transferring heat therefrom to the inflowing liquid.

3. The process of separating solids from liquids which consists in heating a liquid carrying solids in suspension while preventing flocculation of the solids, then permitting said solids to flocculate and collecting them beneath a body of the heated liquid, continuously withdrawing the clear liquid and the separated solids, and finally cooling said liquid by transferring heat therefrom to the inflowing liquid.

4. The process of separating solids from liquids which consists in heating a liquid carrying solids in suspension while preventing flocculation of the solids, then permitting said solids to flocculate while retaining them under pressure and collecting them beneath a body of the heated liquid, continuously withdrawing the clear liquid and the separated solids, and finally cooling said liquid by transferring heat therefrom to the inflowing liquid.

5. The process of separating solids from liquids which consists in heating a liquid carrying solids in suspension while preventing flocculation of the solids, then permitting said solids to flocculate, and separating them from the heated liquid by filtration, substantially as described.

6. The process of treating saccharine solutions which consists in heating said solutions while preventing flocculation of solids carried thereby, then permitting said solids to flocculate, and separating them from the heated liquid by filtration, substantially as described.

In testimony whereof, I affix my signature in presence of two witnesses.

EUGENE W. DEMING.

Witnesses:
V. FOWLER,
K. T. RICHARD.